United States Patent

Nakazato et al.

[11] Patent Number: 5,804,608
[45] Date of Patent: Sep. 8, 1998

[54] HEAT-FOAMABLE FILLING REINFORCEMENT AND REINFORCED CLOSED-SECTION STRUCTURAL-MEMBER MAKING USE OF THE SAME

[75] Inventors: Kazuyuki Nakazato; Hideki Fukudome, both of Tokyo, Japan

[73] Assignee: Mitsubishi Jidosha Kogyo Kabushiki Kaisha, Tokyo, Japan

[21] Appl. No.: 716,432

[22] PCT Filed: Jan. 18, 1996

[86] PCT No.: PCT/JP96/00073

§ 371 Date: Sep. 20, 1996

§ 102(e) Date: Sep. 20, 1996

[87] PCT Pub. No.: WO96/22324

PCT Pub. Date: Jul. 25, 1996

[30] Foreign Application Priority Data

Jan. 21, 1995 [JP] Japan ................................. 7-026330

[51] Int. Cl.$^6$ .......................................................... C08L 63/00
[52] U.S. Cl. ........................ 521/135; 428/413; 428/423.1; 428/492; 428/500; 521/148; 521/149; 521/150; 521/155; 521/178

[58] Field of Search ..................................... 521/148, 135, 521/149, 150, 155, 178; 428/413, 423.1, 492, 500

[56] References Cited

FOREIGN PATENT DOCUMENTS 56-127639  6/1981  Japan .
4-264142  9/1992  Japan .

Primary Examiner—John M. Cooney, Jr.
Attorney, Agent, or Firm—Birch, Stewart, Kolasch & Birch, LLP

[57] ABSTRACT

This invention relates to a reinforced closed-section structural-member structure making use of a heat-foamable filling reinforcement. The structure has been formed by connecting plural closed-section structural members (11–15) together. These closed-section structural members (11–15) are internally filled with a heat-foamed filling reinforcement (1) which comprises an epoxy resin material, a synthetic rubber material and a thermoplastic resin material as components.

4 Claims, 21 Drawing Sheets

SITES WITH FOAMED MATERIAL APPLIED THEREIN

FIG. 7(a) BEFORE FOAMING AND CURING
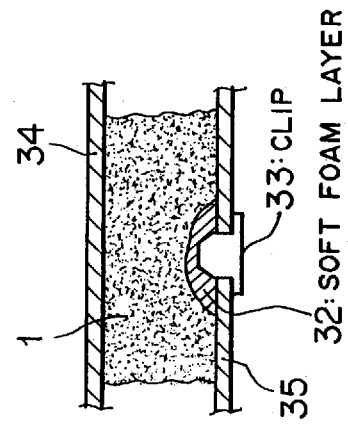
34
32: SOFT FOAM LAYER
31: CLIP INSERTION HOLE
35
1: FOAMABLE MATERIAL (FOAMED SHEET)
FIG. 7(b) AFTER FOAMING AND CURING
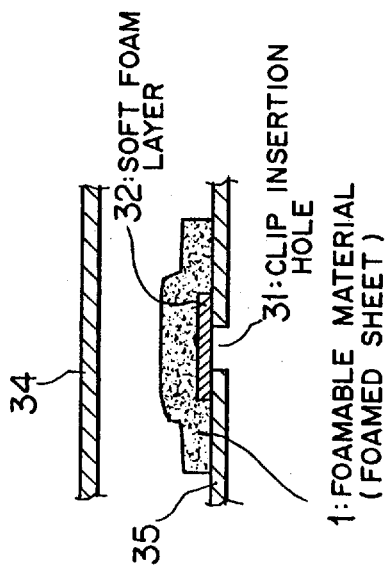
34
1
33: CLIP
32: SOFT FOAM LAYER
35

FIG. 8

| | SHAPE | CROSS-SECTION |
|---|---|---|
| FOR FLEXURAL OR TWISTING TEST | L=500 mm, 41, SHEET THICKNESS:1mm, SPOT WELDED (P=50) | 100, 60, 40 |
| FOR COMPRESSION TEST | L=300 mm, 41, SHEET THICKNESS:1mm, SPOT WELDED (P=50) | 100, 60, 60 |

FIG. 15

COMPONENTS OF DEVELOPED MATERIAL
AND OBJECTIVES OF THEIR ADDITION

| MATERIAL | WEIGHT PERCENTAGE (wt. %) | OBJECTIVE OF ADDITION |
|---|---|---|
| EPOXY RESIN | 35 | HIGH RIGIDITY, HIGH DURABILITY, HIGH ADHESION |
| SYNTHETIC RUBBER | 8 | FORMABILITY |
| THERMOPLASTIC ELASTOMER | 6 | ADJUSTMENT OF MELT VISCOSITY |
| FOAMING AGENT | 2 | FOAMING |
| CURING AGENT, CURING ACCELERATOR | 3 | CROSSLINKING OF EPOXY RESIN |
| CARBON BLACK | 2 | REINFORCEMENT COLORING |
| FILLER | 44 | SHAPE RETENTION |
| TOTAL | 100 | |

FIG. 16

COMPOSITIONS AND PRINCIPAL PHYSICAL PROPERTIES

|  | Ex. 1 | Ex. 2 | COMP. Ex. 1 | COMP. Ex. 2 |
|---|---|---|---|---|
| EPOXY RESIN (wt. %) | 35 | 35 | 35 | 35 |
| MODIFIED NBR (wt. %) | 8 | 10 | - | 8 |
| SBR-1502 (wt. %) | - | - | 8 | - |
| MODIFIED STYRENE (wt. %) | 7 | 6 | 7 | - |
| ORGANIC BENTONITE (wt. %) | - | - | - | 7 |
| FOAMING AGENT (wt. %) | 2 | 2 | 2 | 2 |
| CURING AGENT (wt. %) | 3 | 3 | 3 | 3 |
| CALCIUM CARBONATE (wt. %) | 45 | 44 | 45 | 45 |
|  |  |  |  |  |
| EXPANSION RATIO (%) | 350 | 330 | 100 | 150 |
| SAGS (mm) | 15 | 15 | 15 | 20 |
| GREASED SURFACE ADHESION | A | A | C | A |

A: GOOD, C: UNACCEPTABLY POOR.

FIG. 17

COMPOSITIONS AND PRINCIPAL PHYSICAL PROPERTIES

|  | COMP. Ex. 3 | COMP. Ex. 4 | COMP. Ex. 5 | COMP. Ex. 6 |
|---|---|---|---|---|
| EPOXY RESIN (wt %) | 35 | 35 | 35 | 35 |
| MODIFIED NBR (wt %) | 25 | 8 | 8 | 2 |
| SBR-1502 (wt. %) | - | - | - | - |
| MODIFIED STYRENE (wt.%) | 7 | 20 | 2 | 7 |
| ORGANIC BENTONITE (wt.%) | - | - | - | - |
| FOAMING AGENT (wt. %) | 2 | 2 | 2 | 2 |
| CURING AGENT (wt. %) | 3 | 3 | 3 | 3 |
| CALCIUM CARBONATE (wt. %) | 25 | 32 | 50 | 50 |
|  |  |  |  |  |
| EXPANSION RATIO (%) | 200 | 270 | 360 | 250 |
| SAGS (mm) | 25 | 10 | 65 | 25 |
| GREASED SURFACE ADHESION | B | C | A | A |

A: GOOD, B: SOMEWHAT INFERIOR, C: UNACCEPTABLY POOR

FIG. 18

COMPOSITIONS AND PRINCIPAL PHYSICAL PROPERTIES

| COMPONENTS & PHYSICAL PROPERTIES | MATERIALS | DEVELOPED MATERIAL | COMP. MATERIAL | COMP. MATERIAL |
|---|---|---|---|---|
| COMPOSITION, % | RUBBER-MODIFIED EPOXY RESIN | 35 | 30 | 35 |
| | PLASTICIZER | 0 | 3 | 5 |
| | HIGH-COMPATIBILITY RUBBER | 8 | - | - |
| | GENERAL-PURPOSE SYNTHETIC RUBBER | - | 16 | 15 |
| | THERMOPLASTIC ELASTOMER | 7 | 7 | 2 |
| | FILLER | 45 | 40 | 35 |
| | OTHERS | 5 | 4 | 8 |
| PPP * | EXPANSION RATIO (%) | 280 | 100 | 250 |
| | MODULUS OF FLEXURAL ELASTICITY (Mpa) | 550 | 100 | 80 |
| | SAGGS (mm) | 15 | 15 | 60 |

* PPP: PRINCIPAL PHYSICAL PROPERTIES

FIG. 19

PRINCIPAL PHYSICAL PROPERTIES OF DEVELOPED MATERIAL

| TESTED PROPERTIES | | | RESULTS | |
|---|---|---|---|---|
| | | | DEVELOPED MATERIAL | CURRENT EXPANDABLE FILLING MATERIAL |
| BEFORE CURING | SPECIFIC GRAVITY 20°C | BEFORE BAKING | 1.21 | 1.10 |
| | | AFTER BAKING | 0.40 | 0.13 |
| | ASH CONTENT % | 180° x 20 min | 22.8 | 16.1 |
| PHYSICAL PROPERTIES AFTER CURING | WATER ABSORPTION % | 20°C $H_2O$ x 24 hr | 3.0 | 5.7 |
| | POST-WATER-ABSORPTION % RESTORABILITY | 20°C $H_2O$ x 48 hr | 2.7 | 1.3 |
| | FLEXURAL STRENGTH MPa | UNDER 20°C ATMOSPHERE | 1.7 | - |
| | COMPRESSION STRENGTH MPa | UNDER 20°C ATMOSPHERE | 1.3 | - |
| PHYSICAL PROPERTIES OF ADHESION | ADHESIVE STRENGTH MPa | UNDER 20°C ATMOSPHERE | 2.7 | 0.03 |
| | IMPACT RESISTANCE (TIMES) | 20° x 3hr | 3 | - |
| | | AFTER 80° x 336 hr | 6 | - |
| | | AFTER 50°, 95% x 336 hr | 13 | - |
| | | AFTER 5 HEAT CYCLES | 6 | - |
| | | AFTER 40°C $H_2O$ x 336 hr | 20 | - |
| | CORROSION RESISTANCE | AFTER 48 DRY/WET CYCLES | NO RUSTING | NO RUSTING |

FIG. 20

PRINCIPAL WORK CHARACTERISTICS

| | TESTED CHARACTERISTICS | REQUIREMENTS | DEVELOPED MATERIAL | FOAMED MATERIAL OF PRIOR ART |
|---|---|---|---|---|
| WELDING STEP | FIXEDNESS ON GREASED SURFACE | SHOULD BE FREE FROM SEPARATION, DISPLACEMENT OR FALLING | NO PROBLEM | NO PROBLEM |
| COATING STEP | STORAGE STABILITY | ≥150% | 200-300 | 700-750 |
| | FOULING TENDENCY OF DEGREASING SOLUTION | SHOULD BE FREE FROM FOULING OF SOLUTION OR DISSOLUTION OF SHEET | NO PROBLEM | NO PROBLEM |
| | FOULING TENDENCY OF CHEMICAL SOLUTION | | NO PROBLEM | NO PROBLEM |
| | FOULING TENDENCY OF ELECTRODEPOSITION SOLN. | | NO PROBLEM | NO PROBLEM |
| | VERTICAL BAKING APPLICABILITY | SHOULD BE FREE FROM SAGGING OR SAGGED TEARING | NO PROBLEM | NO PROBLEM |
| | EXPANDABILITY | ≥200 | 250-300 | 800-900 |
| | ODORIFEROUSNESS | SHOULD BE FREE OF UNPLEASANT OR IRRITATING ODOR | NO PROBLEM | NO PROBLEM |

FIG. 21
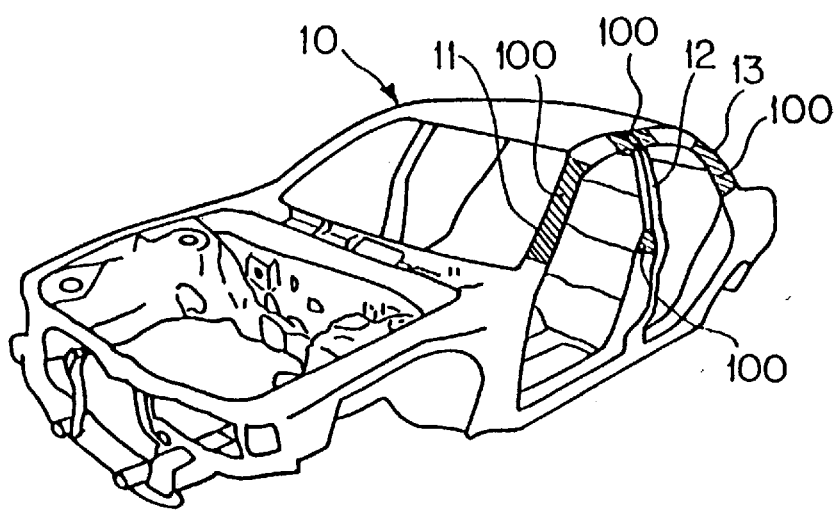
 SITES WITH FOAMED MATERIAL APPLIED THEREIN

FIG. 22
TYPES OF FOAMABLE FILLING MATERIALS AND THEIR CHARACTERISTICS

| | FORMED SHEET MATERIAL | | | LIQUID MATERIAL |
|---|---|---|---|---|
| | BR RUBBER BASE | POLYETHYLENE BASE | | POLYURETHANE BASE |
| APPLICATION STEP | WELD ASSEMBLING STEP | WELD ASSEMBLING STEP | | INSTALLATION AND ASSEMBLING STEP |
| APPLICATION METHOD | BONDING OF EXTRUDED SHEET | MECHANICAL FASTENING OF INJECTION-MOLDED SHEET | | INJECTION THROUGH 2-PACK MIXING NOZZLE |
| CURING METHOD | CURED IN ED COATING BAKING OVEN | CURED IN ED COATING BAKING OVEN | | CURED THROUGH ROOM-TEMPERATURE REACTION |
| GREASED SURFACE ADHESION | A | A | | C |
| PREVENTION OF LIQUID LEAKAGE | NOT NEEDED | NOT NEEDED | | NEEDED (PARTITIONS OR THE LIKE) |
| RUSTPROOFING PROPERTIES | A | B | | C |
| NOISE INSULATION | A | B | | A |
| FLEXURAL STRENGTH | C | B | | B |
| FACILITIES | NOT NEEDED | NOT NEEDED | | MIXING COATING IS NEEDED |
| TOTAL COST | A | A | | B |

A: GOOD; B: SOMEWHAT INFERIOR, C: UNACCEPTABLY POOR.

HEAT-FOAMABLE FILLING REINFORCEMENT AND REINFORCED CLOSED-SECTION STRUCTURAL-MEMBER MAKING USE OF THE SAME

TECHNICAL FIELD

This invention relates to a heat-foamable filling reinforcement and also to a reinforced closed-section structural-member structure making use of the same.

BACKGROUND ART

Foamed materials are now used in pillars, roof header panels and the like of vehicle bodies, centering around high-grade vehicles, with a view to achieving improvements in noise insulation and improvements in energy absorption characteristics. It is FIG. 21 that illustrates sites with a foamed material applied therein. As is shown in FIG. 21, an foamed material 100 is filled in pillars (front pillars 11, center pillars 12 and rear pillars 13) of a vehicle body 10.

For the foamed material 100, a formed sheet material of a synthetic rubber such as a SBR rubber (butadiene-base rubber) or an SBR rubber (styrene-butadiene-base rubber) or polyethylene or a polyurethane-base liquid material is used. Their characteristics are shown in FIG. 22. In essence, a formed sheet material is easy in application work and compared with a liquid material, is also advantageous in total cost.

However, the use of the conventional foamed material 100 made of such a synthetic rubber or urethane-base material (whose expansion ratio ranges from 200 to 2,000 percent) in pillars, a roof header panel and the like is accompanied by the problem that no contribution is made to improvements in their structural strength and rigidity, because the objective of its use is to improve the noise insulation and the energy absorption characteristics.

Incidentally, a closed-section structure is often used in connecting members of a vehicle so that rigidification of a foamed material, if feasible, is expected to improve the rigidity of such connecting members and/or to achieve their integration. However, the conventional foamed material 100 does not have a rigidity-improving function because its primary objective is to improve noise insulation or energy absorption as described above.

With the foregoing problem in view, the present invention has as its object the provision of a heat-foambsle filling reinforcement of such a light weight and low price as not available to date and also of a reinforced closed-section structural-member structure making use of the heat-foamable filling reinforcement.

DISCLOSURE OF THE INVENTION

A heat-foamable filling reinforcement according to the present invention is characterized in that said heat-foamable filling reinforcement comprises at least an epoxy resin material, a synthetic rubber material and a thermoplastic resin material as components, and said epoxy resin material amounts to 30–45 wt. %, said synthetic rubber material amounts to 5–15 wt. % and said thermoplastic resin material amounts to 5–15 wt. %, with the total of the weight percentages of the individual components being in a range not exceeding 100 wt. %. Owing to these characteristic features, the heat-foamable filling reinforcement according to the present invention bring about substantial improvements in flexural rigidity and twisting rigidity and also an improvement in energy absorption characteristics.

Preferably, the heat-foamable filling reinforcement further comprises a filler as a component, and the filler amounts to 40–50 wt. % with the total of the weight percentages of the individual components including the filler being in a range not exceeding 100 wt. %. These features can reduce the cost.

Further, a reinforced closed-section structural-member structure according to the present invention, said structure making use of a heat-foamable filling reinforcement and being formed of plural closed-section structural members connected together, is characterized in that the closed-section structural members are internally filled with a heat-foamable filling reinforcement which comprises an epoxy resin material, a synthetic rubber material and a thermoplastic resin material as components. These features can bring about improved rigidity, thereby making it possible to achieve a weight reduction through a reduction in the thickness of panels and also to attain obviation of reinforcing components such as a bulkhead. As a result, it is possible to meritoriously achieve a weight reduction as much as several kilograms per vehicle while sufficiently maintaining the noise insulation at the conventional level.

In the above-described structure, the heat-foamable filling reinforcement may also contain a filler as a component or calcium carbonate as a component. This feature makes it possible to prevent runs (sags) of the heat-foamable filling reinforcement upon heating.

The heat-foamable filling reinforcement, which comprises the epoxy resin material, the synthetic rubber material and the thermoplastic resin material as the components, may be partially filled in or adjacent to connected parts of the closed-section structural members. This feature can contribute to a further improvement in rigidity and also to a further reduction in weight over the conventional heat-foamable filling reinforcements.

Further, the epoxy resin material amounts to 30–45 wt. % and is in the form of a foamed material, the synthetic rubber material amounts to 5–15 wt. %, and the thermoplastic resin material amounts to 5–15 wt. %. According to this composition, the content of the synthetic rubber material is as low as about ½ of the conventional content, whereby a plasticizer is no longer needed and a high expansion ratio and high rigidity can be achieved.

For the heat-foamed filling reinforcement, it is preferred to use a foamable material whose expansion ratio ranges from 200 to 500 percent after heating and curing. This makes it possible to fill the heat-foamable filling reinforcement at a higher efficiency in the closed-section structural members.

BRIEF DESCRIPTION OF THE DRAWINGS

FIG. 7(*a*) and FIG. 7(*b*) both illustrate the manner of handling of a clip-insertion hole;

FIG. 8 illustrates use of straight frame specimens;

FIG. 15 shows components of a heat-foamable filling reinforcement according to the present invention and objectives of their addition;

FIG. 16 shows variations in principal physical properties depending on the composition;

FIG. 17 also shows variations in principal physical properties depending on the composition;

FIG. 18 also shows variations in principal physical properties depending on the composition;

FIG. 19 compares a heat-foamable filling reinforcement according to the present invention in physical properties with a foamed material of the prior art;

FIG. 20 compares the heat-foamable filling reinforcement according to the present invention in work characteristics with the the foamed material of the prior art;

FIG. 21 shows sites to which a conventional product is applied; and

FIG. 22 shows characteristics of formed sheets materials of a synthetic rubber, such as BR rubber or SBR rubber, or of polyethylene and a polyurethane-base liquid material, all, as conventional foamable materials.

BEST MODE FOR CARRYING OUT THE INVENTION

With reference to the drawings, a description will hereinafter be made about a heat-foamable filling reinforcement according to one embodiment of the present invention and a reinforced closed-section structural-member structure making use of the heat-foamable filling reinforcement.

First, characteristics and physical properties of the heat-foamable filling reinforcement according to the present invention will be described.

Upon development of the heat-foamable filling reinforcement (which may hereinafter be called "the developed material"), an investigation was conducted with a target placed in obtaining one permitting similar handling as foamable materials employed to date and as a light-weight and low-cost material, enabling to achieve an overall cost merit, to say nothing of a reduction in the weight of a real car. Although epoxy resins, polyurethanes, acrylic resins and the like were studied, a principal component of the material was limited to epoxy resins for their highest possibility of most closely approaching the above target.

Figure 3:
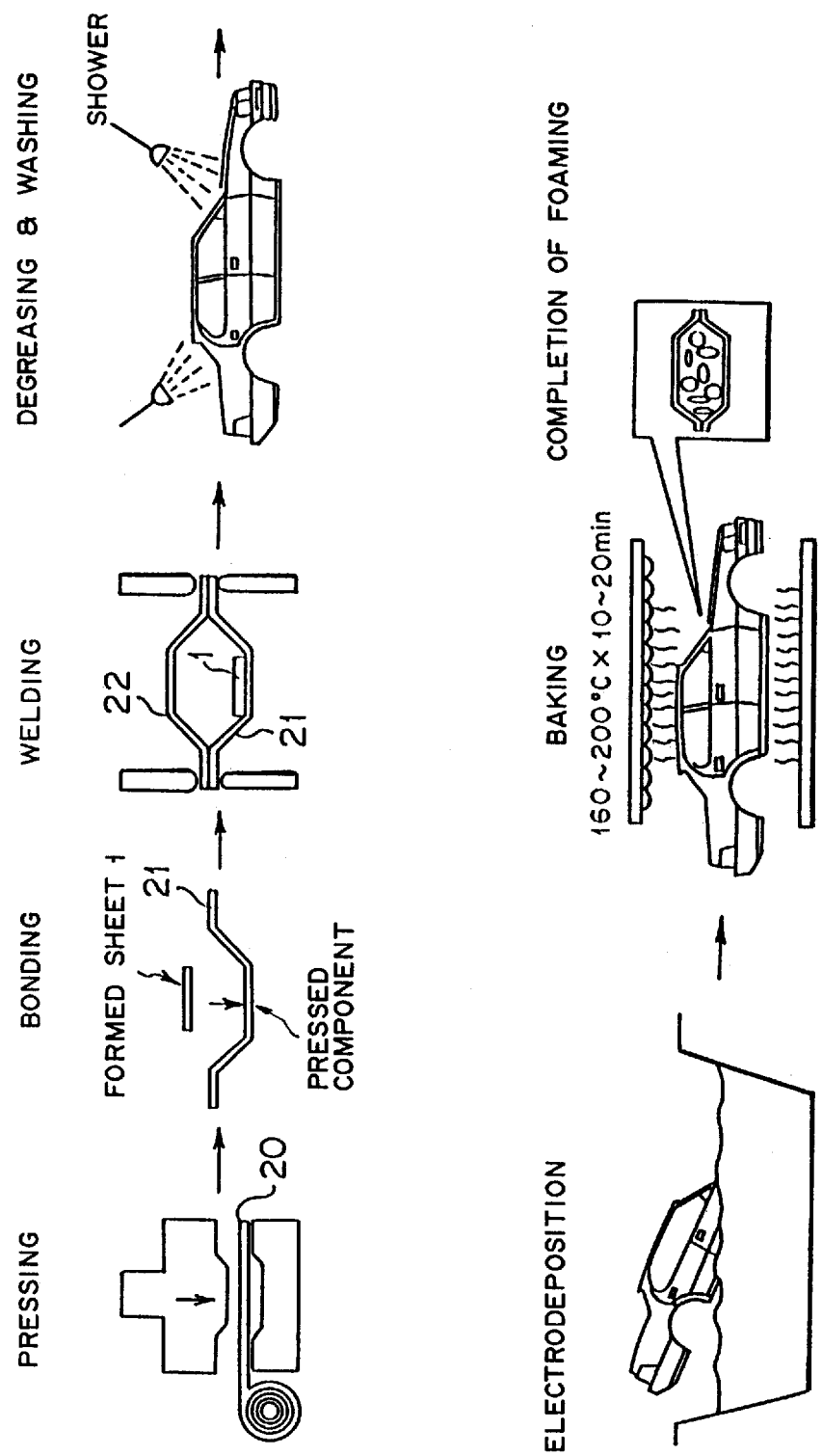
FIG. 3 illustrates working steps of an foamable material in the form of a sheet.

On the premise that the heat-foamable filing reinforcement would be used in a weld assembling step (see the steps in FIG. 3) of a vehicle component, a formed sheet was chosen as the form of the material. According to the steps of FIG. 3, a component 20 is first pressed in a pressing step, a heat-foamable filling reinforcement 1 in the form of a sheet is bonded on the pressed component 21, and the pressed components 21,22 are welded together. The thus-welded components are then processed through a degreasing and washing step, and an electrodeposition step and foaming is completed in a baking step.

Figure 4:
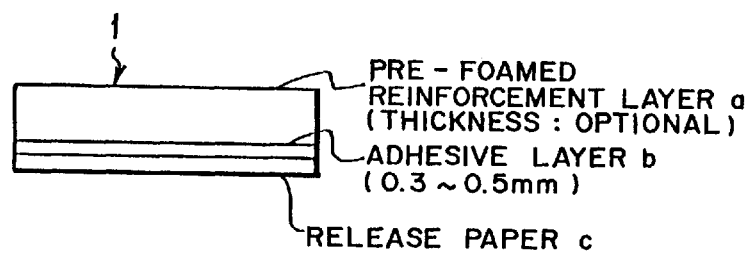
FIG. 4 illustrates use of a pre-formed reinforcement according to the present invention.

The heat-foamable filling reinforcement 1 in the form of the sheet is bonded on the pressed component 21 as described above. With a view to achieving improvements in initial adhesion and rustproofing properties, the heat-foamable filling reinforcement 1 was furnished as a double layer type which was composed of a pre-formed reinforcement a, and an adhesive layer b. Incidentally, in FIG. 4, c designates a release paper.

A description will next be made of features devised in composition, which have realized the high expansion ratio and high rigidity as great merits of the heat-foamable filling reinforcement 1.

The viscosity of an epoxy resin is readily affected by the temperature. In a high temperature range (160°–200° C.) as in a vehicle paint baking oven, the resin viscosity becomes excessively low so that the resin cannot hold decomposition gas of a foaming agent and can hardly achieve a high expansion ratio. With such a problem in background, a great deal of a synthetic rubber (BR, SBR or the like) has been incorporated to hold gas and a plasticizer has also been added to enhance the compatibility of the synthetic rubber. It has hence been difficult to obtain a highrigidity body of a high expansion ratio from such a composition.

However, in attempts to increase the melt viscosity of a material and hence to improve the gasholding ability at the time of baking and curing, attention was paid to improve the compatibility between an epoxy resin and a synthetic rubber without adding a plasticizer. Thus, using as a base an epoxy resin on which a synthetic rubber had already been polymerized, a rubber of the same type was incorporated as a post additive, followed by further incorporation of a resin-base elastomer (thermoplastic resin material). Namely, the heat-foamable filling reinforcement 1 comprises at least an epoxy resin material, a synthetic rubber material and a thermoplastic resin material as components, and more specifically, it comprises 30–45 wt. % of the epoxy resin material, 5–15 wt. % of the synthetic rubber material, 5–15 wt. % of the thermoplastic resin material and further, 40–50 wt. % of a filler. As the heat-foamable filling reinforcement 1, a foamable material capable of achieving an expansion ratio of 200–500 percent after heating and curing can be used. Further, one capable of providing compression strength as high as 10 kg/cm$^2$ or more can be used.

Here, the components of the heat-foamable filling reinforcement 1 and objectives of their addition are shown in FIG. 15.

As will also appreciated from FIG. 15, the epoxy resin material is added to impart high rigidity, high durability and high adhesion, the synthetic rubber material is added to impart formability, and the thermoplastic resin material is added to regulate the melt viscosity. Further, the foaming agent is added to achieve expansion or foaming, the curing agent and the curing accelerator are added to crosslink the epoxy resin material, carbon black is added to achieve reinforcement and coloring, and the filler is added to impart shape retention.

On the other hand, the proportions of the epoxy resin material, the synthetic rubber material, the thermoplastic resin material and the like are determined as will be described next.

First, concerning the epoxy resin material, its low proportion leads to inferior rigidity, durability and adhesion. At least 25 wt. % is therefore needed. Its high proportion, on the other hand, leads to a problem in cost, so that the upper limit is set at 40 wt. % or so.

With respect to the synthetic rubber material, its low proportion poses a problem in formability so that at least 5 wt. % is needed. Its high proportion, on the other hand, leads to a higher hardness, so that the upper limit is set at 15 wt. % or so.

Regarding the thermoplastic resin material, its proportion is set in a range of 5–5 wt. % from the viewpoint of regulation of the melt viscosity.

The synthetic rubber and the thermoplastic resin, which are essential elements of the present invention, will next be described further.

A description will first be made of the synthetic rubber.

Despite the form of the epoxy resin at room temperature (liquid to solid), it takes the form of a liquid having a low viscosity at high temperatures of 160°–250° C. so that it cannot hold decomposition gas of the foaming agent, thereby making it impossible to obtain a product of a high expansion ratio. Further, if the viscosity undergoes considerable variations depending on the temperature at the time of processing, inconvenience arises in compatibility upon mixing, in extrudability upon forming, etc.

To overcome these problems, the present invention makes use of the synthetic rubber which has good compatibility with the epoxy resin. Usable examples of the synthetic rubber include Acrylonitrile-Butadine Rubber (NBR), carboxylated NBR, epoxy (NR), epichlorohydrin rubber, modified NBR, and the like.

When such a rubber is blended with the epoxy resin, viscosity is produced at a high-temperature time, thereby promoting the growth of films by foaming, enhancing the holding of foaming gas and hence making it possible to obtain a body of a high-expansion ratio.

In addition, the temperature-dependent viscosity variations are reduced, thereby improving the processability. Owing to the combination of this fact and the improved viscosity at room temperature, good bonding on a pressed component is always assured irrespective of the season.

To bring about these advantageous effects, the synthetic rubber is added in a proportion of 5–15 wt. % as described above. To achieve optimal expansion or foaming, however, 5–10 wt. % is desired. Incidentally, addition in a large proportion leads to a loss in reinforcing ability.

A description will next be made about the thermoplastic resin.

Namely, the thermoplastic resin is used to prevent runs (sags) under heat in an ED drying oven when the heat-foamable filling reinforcement (developed material) 1 is used in a vertical portion. Usable examples of the thermoplastic resin include polyvinyl butyral, styrene, modified styrene products, acrylic acid, modified acrylic products, polyamides and the like. Organic bentonite, colloidal silica or the like has conventionally be used. Use of these conventional materials results in a low viscosity and easy escape of at a high-temperature time, thereby failing to obtain a product of a high expansion ratio.

To overcome these problems, the present invention makes use of the thermoplastic resin so that at high temperatures, viscosity can be produced to such a level as eliminating runs or sags.

For this viscosity adjustment, the thermoplastic resin is generally added in a proportion of 5–15 wt. % although the proportion varies depending on the molecular weight and melting point of the resin. The optimal proportion ranges from 5 to 10 wt. %. An unduly large proportion leads to deteriorations in reinforcing ability and the fixedness on a greased surface.

Fibers (glass, pulp, or asbestos) or fine particulate calcium carbonate is used for the prevention of runs.

Since the content of the synthetic rubber in the heat-foamable filling reinforcement 1 has been reduced to about ½ of the conventional content as described above, a plasticizer has become no longer necessary so that a high expansion ratio and high rigidity have been achieved.

Some examples will next be described together with comparative examples. They can be summarized as shown in FIG. 16 to FIG. 18.

In these figures, Comparative Example 1 employed, as a synthetic rubber material, SBR-1502 which does not have compatibility. The material therefore did not develop viscosity, had high fixedness on a greased surface, was putty and was not foamed. Comparative Example 2 employed organic bentonite for the prevention of sags, which adversely affected the foaming. In Comparative Example 3, the content of the synthetic rubber was increased so that the viscosity at high temperatures became higher, the expansion ratio was low, the resulting sheet was hard and the adhesion was lowered. In Comparative Example 4, the content of the thermoplastic resin material was increased so that like Comparative Example 3, the expansion ratio was lowered, the resulting sheet was hard and the adhesion was lowered. In Comparative Example 5, the content of the thermoplastic resin material was lowered, resulting in greater sags. In Comparative Example 6, the content of the synthetic rubber was lowered so that the expansion ratio became lower and the resulting sheet was not satisfactory in properties.

Incidentally, the term "developed material" as used in FIG. 18 means the heat-foamable filling reinforcement 1.

Figure 5:
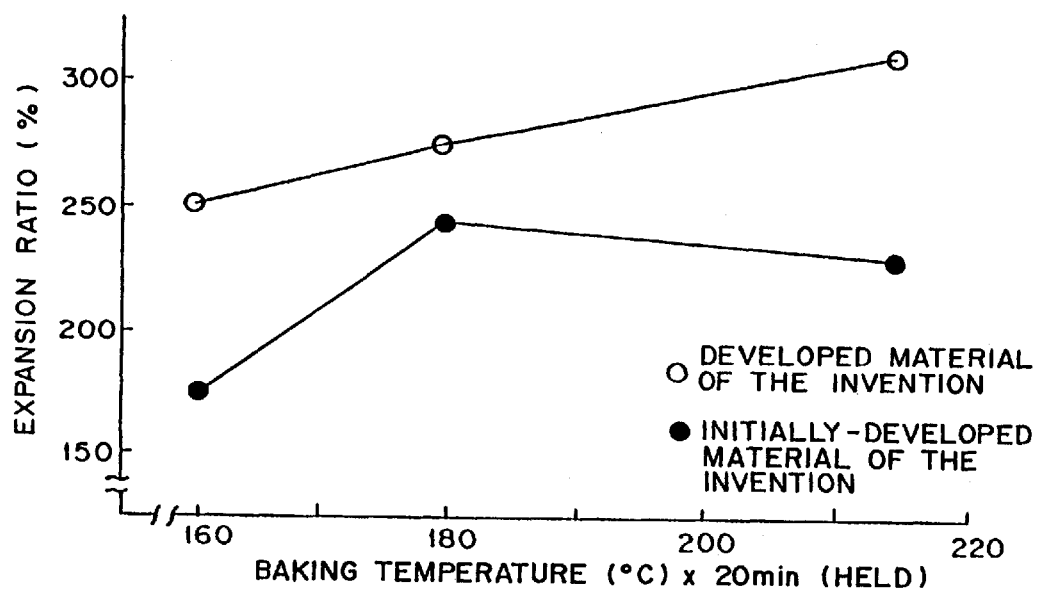
FIG. 5 depicts expansion ratios as a function of baking, foaming and curing conditions.

This developed material has also been found to achieve prevention of sags upon foaming and curing and also a uniform expansion ratio owing to its adjusted melt viscosity (see FIG. 5).

As a further characteristic feature, it is also mentioned that in addition to a high expansion ratio, the content of the filler (calcium carbonate or the like) has been increased close to 50% (by weight) based on the whole material to provide the material as an economical material.

Further, the developed material (the heat-foamable filing reinforcement according to the present invention) 1 is compared in physical properties with a foamed material of the prior art in FIG. 19.

A description will next be made about work characteristics of the developed material (the heat-foamable filing reinforcement according to the present invention) 1.

First, the developed material is used in a weld assembling step of a component (see FIG. 3) so that it is necessary to confirm its compatibility with working steps such as its greased surface adhesion, its vertical baking applicability and its influence to a painting step. Its foaming and curing properties are also important because electrodeposition coating formulations of low-temperature and short-time curing type are adopted recently and paint baking ovens have become lower in temperature and shorter in processing time.

Figure 6:
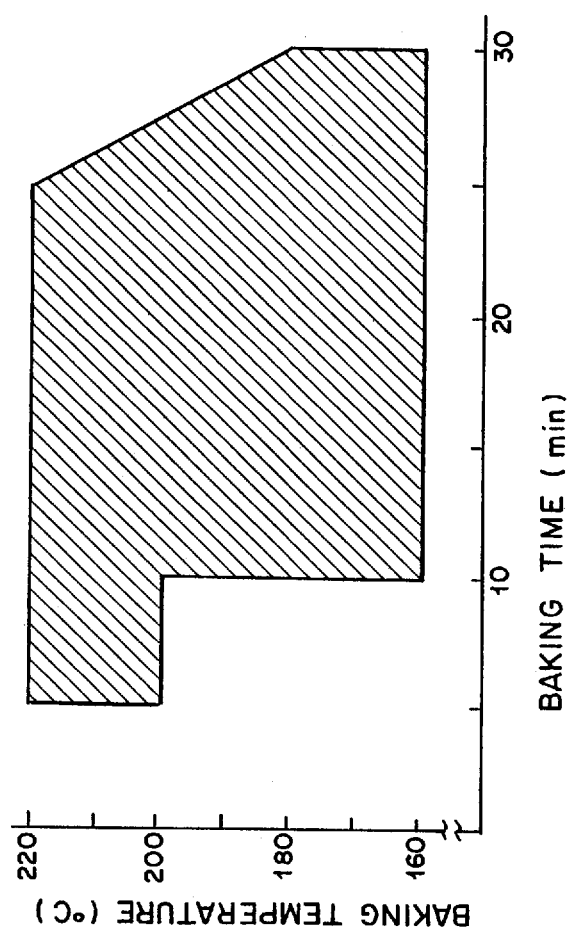
FIG. 6 depicts an appropriate range of baking, foaming and curing conditions.

It is however understood that the developed material 1 can meet a wide range of baking conditions from a low-temperature range to a high-temperature range owing to the adoption of a low-temperature reactive curing agent and a low-temperature decomposable foaming agent (see FIG. 6).

Further, front pillars and center pillars of a vehicle body, to which the heat-foamable filling reinforcement 1 according to the present invention is applied, are provided with many clip insertion holes for fixing trims, weather strip rubbers and the like. If the heat-foamable filling reinforcement 1 is applied as is, these holes are blocked and due to its high hardness, clips can no longer be inserted there. To avoid this problem, the heat-foamable filling reinforcement has a multi-layer sheet structure so that it is partly formed of a soft synthetic-rubber-base layer (soft layer of foamed material) 32 at a location corresponding to a clip insertion hole 31 as shown in FIG. 7(a). Owing to the provision of the soft layer of foamed material, a clip 33 can be easily inserted without lowering the rigidity of the resulting heat-foamed filing reinforcement as shown in FIG. 7(b). In FIG. 7(a) and FIG. 7(b), numeral 34 indicates an outboard pillar panel while numeral 35 designates an inboard pillar panel.

Other work characteristics are substantially the same as those of the current foamable material and involve no particular problems. The comparison results are shown in FIG. 20.

A further description will now be made about its application to a closed-section structural member.

First of all, quality confirmation making use of a straight frame will be described.

(1) Testing method

Used as a specimen was a specimen 41 which had been obtained by bonding a heat-foamable filling reinforcement (which may be called a "foamable material") on an inner wall of a hat-shaped frame, superposing an associated frame on the former frame, spot-welding the frames together, and then subjecting them to baking under predetermined conditions to cause foaming and curing of the formed sheet (see FIG. 8). Fixing plates are then welded to opposite ends of the specimen 41 to facilitate mounting of the specimen on a testing machine. Using such specimens, a bending test, a twisting test and a compression test were conducted.

(2) Test results

Figure 9:
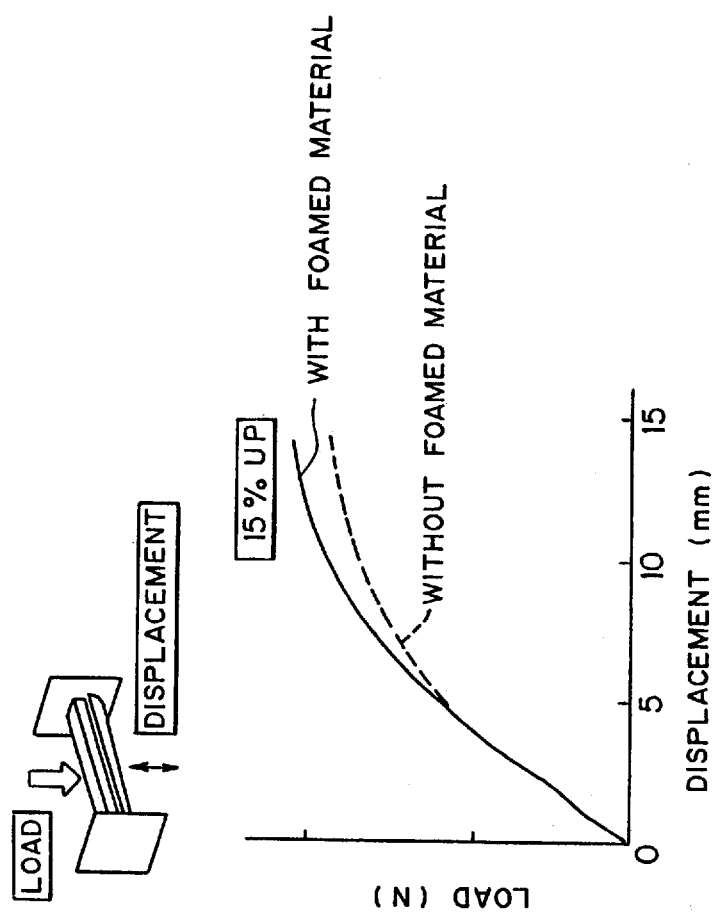
FIG. 9 shows the results of a flexural rigidity test.

The frames with the foamable material 1 according to the present invention filled therein were improved in all the properties and exhibited flexural rigidity higher by as much as 15% (see FIG. 9) and twisting rigidity higher by as much as about 20%, both compared with the specimens without the foamable material. The filling of the foamable material 1 has therefore demonstrated to bring about sufficient advantageous effects.

Figure 10:
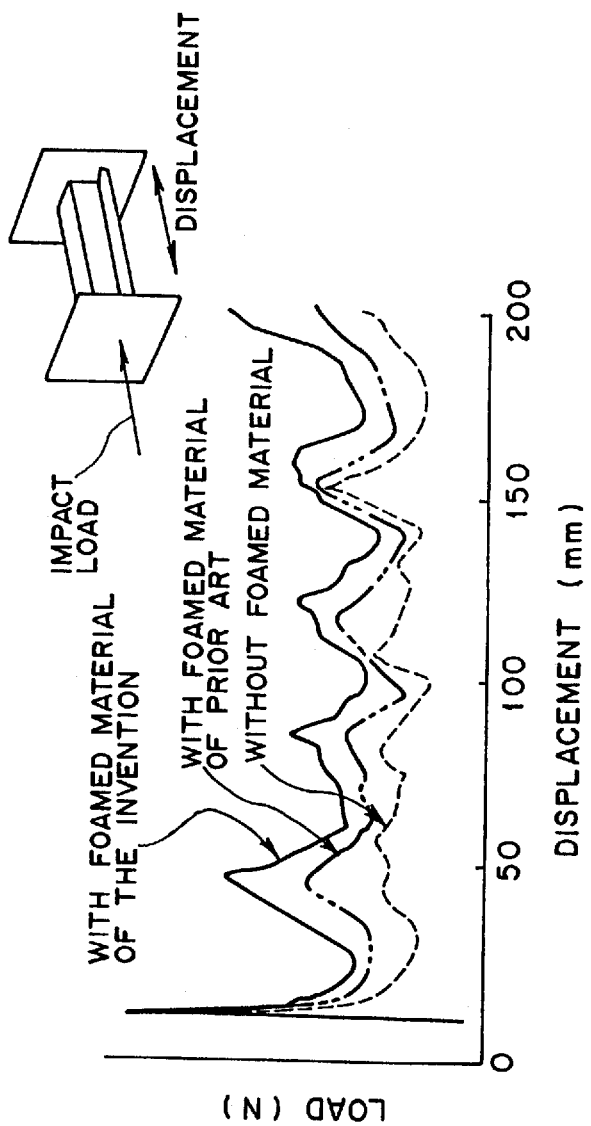
FIG. 10 shows load-displacement characteristics in a compression test.

Further, as is illustrated in FIG. 10, the average breaking resistance has also been found to increase by as much as about 50% in the compression test. In addition, with respect to the efficiency of energy absorption, better results were also obtained than those obtained from the specimen with the conventional foamable material.

Quality confirmation making use of a real component will next be described.

Figure 11:
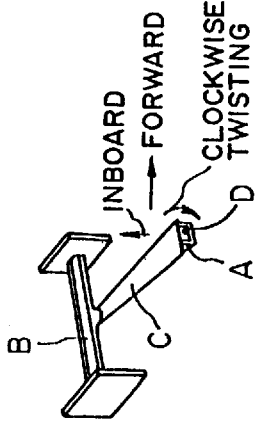
FIG. 11 depicts the specification of a specimen and test conditions.
Figure 12:
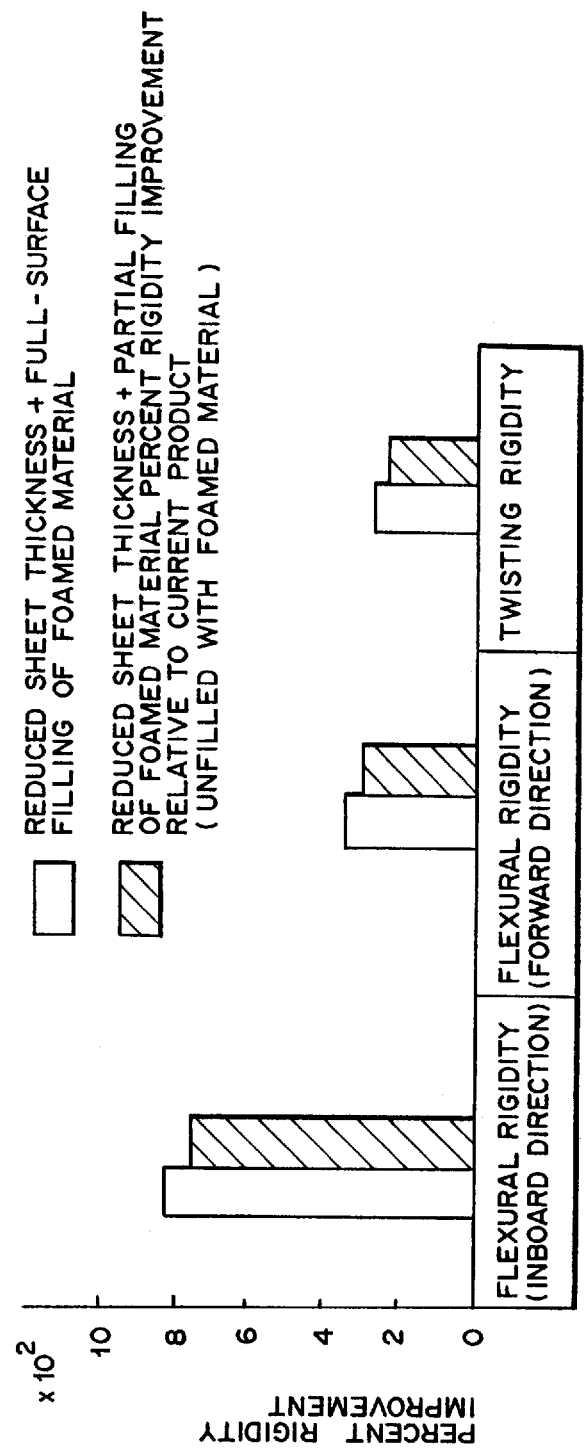
FIG. 12 depicts rigidities measured on real components.

Using a connecting component between a roof rail and a center pillar of a vehicle, the possibility of a reduction in the thickness of a panel, a filling range of the foamable material and the rigidity were confirmed. Specifications of specimens and test conditions are shown in FIG. 11. The flexural rigidity and twisting rigidity were evaluated. As shown in FIG. 12, the results were expressed in terms of percent improvements over those of specimens of the current plate thickness which were not filled with any foamed material.

Described specifically, the thickness-reduced specimens were improved by as much as 3.0 times in twisting rigidity and by as much as 3.7 times in flexural rigidity (forward direction). In particular, the flexural rigidity in the inboard direction was improved by as much as about 8 times. Substantial advantages are therefore brought about by filling the foam. This can be considered to be attributable to effects of the thickness that the cross-sectional shape was convex in an outboard direction in both the roof rail and the center pillar. Further, the percent improvement of the rigidity of the partially-filled specimen was not substantially smaller than that of the full-surface filled specimen, thereby demonstrating a small contribution of the filling range of the foamable material. This indicates that a partially-filled component can exhibit sufficient effects. Accordingly, partial filling results in smaller increases in cost and weight and is considered to be an advantageous condition for practical adoption.

A further description will now be made about quality confirmation on real vehicles.

Figure 1:
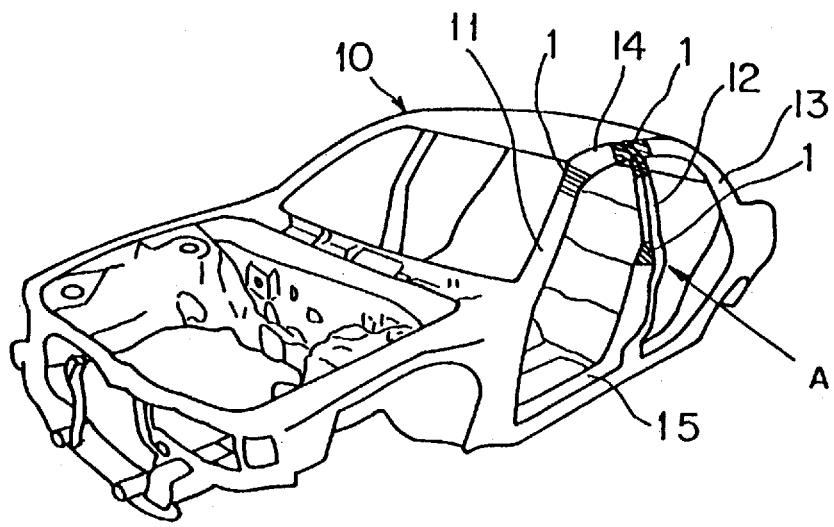
FIG. 1 shows sites to which the present invention is applied.
Figure 2:
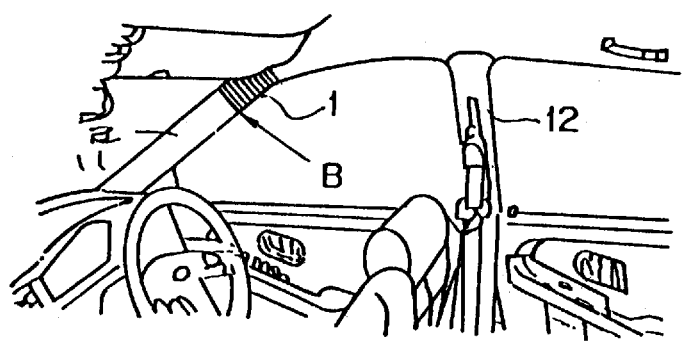
FIG. 2 shows a site to which the present invention is applied.

By applying the heat-foamable filling reinforcements 1 according to the present invention to various sites of the vehicle 10 constructed by connecting plural closed-section structural members such as the pillars 11–13, roof rails 14 and side sills 15 as illustrated in FIG. 1 and FIG. 2, a variety of confirmation tests were conducted to determine optimal effects. Specifically, the heat-foamable filling reinforcements 1 were applied in the connecting portion between the center pillar 12 and the roof rail 14 and also in the front pillar 11. Namely, in a vehicle structure constructed by connecting the plural closed-section structural members 11–15, the heat-foamable filling reinforcements 1 which contains the epoxy resin material, the synthetic rubber material and the thermoplastic resin material as components are filled partially in the connecting portion between the closed-section structural members and also adjacent to the connecting portion, specifically, in a portion adjacent to the connecting portion, for example, within 300 mm from the connecting portion, respectively.

A rigidity test was conducted while applying a load to a point A at a right angle in an inboard direction in FIG. 1. A noise insulation test was conducted by measuring a noise level at a point B by a microphone in FIG. 2.

Figure 13:
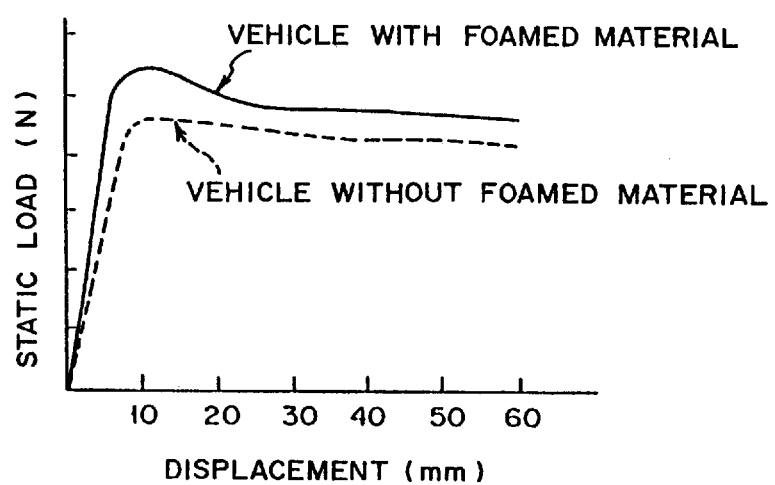
FIG. 13 illustrates the results of a static loading test of a center pillar.

First, as a result of an inboard, static load bending test of the center pillar 12, a rigidity improvement by as much as about 14% was observed over the center pillar not filled with the foamable material. A rise in load on a load-displacement curve was steep, that is, the displacement at the time of the peal load was as much as about 7 mm, thereby demonstrating that the foamable material is also expected to bring about an improvement in energy absorption (see FIG. 13).

Figure 14:
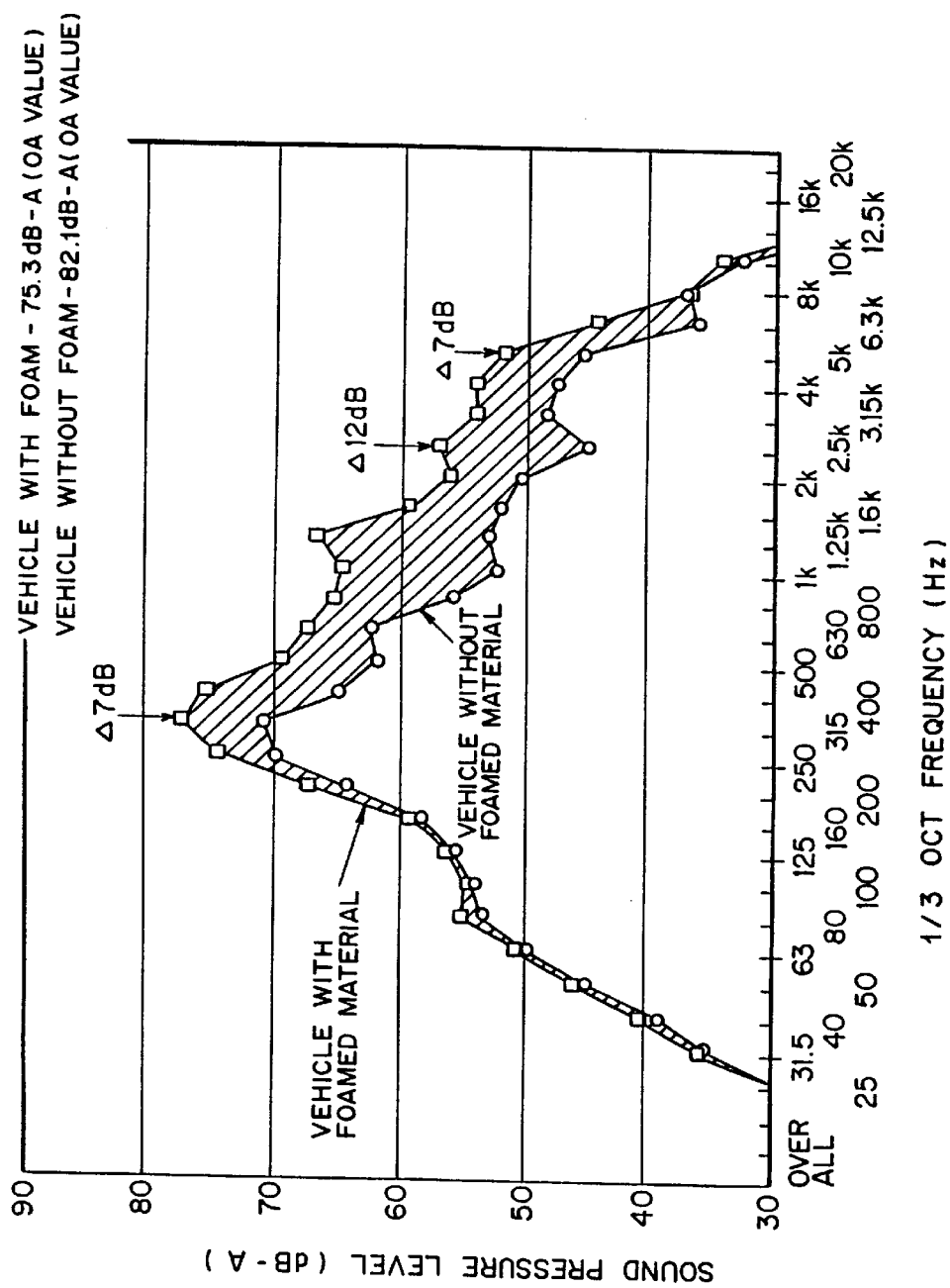
FIG. 14 illustrates the results of a noise insulation test.

Concerning the noise insulation, on the other hand, the internal noise of the front pillar during 100 km/hr running was reduced by 7 to 8 dB on average in a frequency range of 250 Hz and higher, thereby demonstrating sufficient effects (see FIG. 14).

Incidentally, those which were referred to above with numeral 1 in the above Examples (the foamable materials, developed materials and the like) all indicate heat-foamable or heat-foamed filling reinforcements according to the present invention.

Accordingly, the following matters can be mentioned.

In each Example, the rigidity of the closed-section structure was successfully improved owing to the use of the heat-foamable filling reinforcement 1. This makes it possible to achieve a weight reduction through a reduction in the thickness of the panel and also to obviate a reinforcement part such as a bulkhead. As a consequence, the prescribed effect can be obtained (a weight reduction as much as several kilograms per vehicle) while sufficiently assuring the conventional noise insulation.

Needless to say, the heat-foamable filling reinforcement 1 which contains the epoxy resin material, the synthetic rubber material and the thermoplastic resin material as components can be filled over a substantial portion (including the whole portion) of the interior of each closed-section structural member such as a pillar.

CAPABILITY OF EXPLOITATION IN INDUSTRY

According to the present invention, substantial improvements can be achieved in flexural rigidity and twisting rigidity and also improvements in energy absorption characteristics. This invention is therefore suited for use in reinforced closed-section structuralmember structures of a vehicle such as an automobile.

We claim:

1. A heat-foamable filling reinforcement that comprises:
   an epoxy resin material,
   a synthetic rubber material,
   a thermoplastic resin material
   a foaming agent, and
   a filler; and
   wherein:
   (i) before foaming, the heat-foamable filling reinforcement is in the form of a sheet,
   (ii) said foaming agent is added in an amount sufficient to provide the heat-foamable filling reinforcement with an expansion ratio of from 200 to 500% after heating and curing, said epoxy resin material amounts to 30–45 wt. %, said synthetic rubber material amounts to 5–15 wt. %, said thermoplastic resin material amounts to 5–15 wt. %, and said filler amounts to 40–50 wt. %, and with the total of the weight percentages of the individual components including said filler being in a range not exceeding 100 wt. %, as components of the heat-foamable filling reinforcement,
   (iii) the epoxy resin material is comprised of an epoxy resin and at least one synthetic rubber having good compatibility with the epoxy resin and polymerized beforehand with the epoxy resin, which synthetic rubber is selected from the group consisting of acrylonitrile-butadiene rubber, epoxy natural rubber, epichlorohydrin rubber, and modified acrylonitrile-butadiene rubber, and,
   (iv) the synthetic rubber material is selected from the group consisting of acrylonitrile-butadiene rubber, epoxy natural rubber, epichlorohydrin rubber, and modified acrylonitrile-butadiene rubber, and is blended without a plasticizer.

2. A heat-foamable filling reinforcement according to claim 1, wherein before expansion, said heat-foamable filling reinforcement is formed at a part of a sheet surface thereof in a plural-layered structure having a soft foam material which closes up an opening of a hole formed in said inner wall of said closed-section structural portion and becomes a soft layer after expansion.

3. A reinforced closed-section structural member structure containing a heat-foamable filling material, in which a heat-foamable filling reinforcement as defined in claim 1, is filled and formed inside a closed-section structural portion of a vehicle body.

4. A reinforced closed-section structural member structure containing a heat-foamable filling material, in which a heat-foamable filling reinforcement as defined in claim 2, is filled and formed inside a closed-section structural portion of a vehicle body.

* * * * *